United States Patent

Littau

[11] Patent Number: 5,341,630
[45] Date of Patent: Aug. 30, 1994

[54] CATCHER PLATE ASSEMBLY FOR A HARVESTER

[76] Inventor: Eugene G. Littau, 8974 Shaw Square Rd., SE., Aumsville, Oreg. 97325

[21] Appl. No.: 130,734

[22] Filed: Oct. 4, 1993

[51] Int. Cl.$^5$ ............................................. A01D 46/00
[52] U.S. Cl. ............................................................ 56/330
[58] Field of Search .................... 56/328.1, 329, 330

[56] References Cited

U.S. PATENT DOCUMENTS

| 3,538,694 | 11/1970 | Holloway | 56/330 |
| 4,134,251 | 1/1979 | Burton | 56/330 |
| 5,109,657 | 5/1992 | DeVries | 56/330 |
| 5,181,373 | 1/1993 | Littau | 56/330 |

FOREIGN PATENT DOCUMENTS 656583 4/1979 U.S.S.R. ................. 56/330

Primary Examiner—David J. Bagnell
Attorney, Agent, or Firm—Kolisch, Hartwell, Dickinson, McCormack & Heuser

[57] ABSTRACT

A harvester for harvesting berries and the like from plants. The harvester includes a traveling frame, and a plate assembly made up of overlapping plate members. A plate member has a sheet body cut from a sheet of plastic, and a sheet body has turned-over lips bent therein at edges bounding part of the perimeter of the sheet body. An indent-detent in the sheet body serves to space overlapped portions of adjacent sheet bodies.

7 Claims, 3 Drawing Sheets

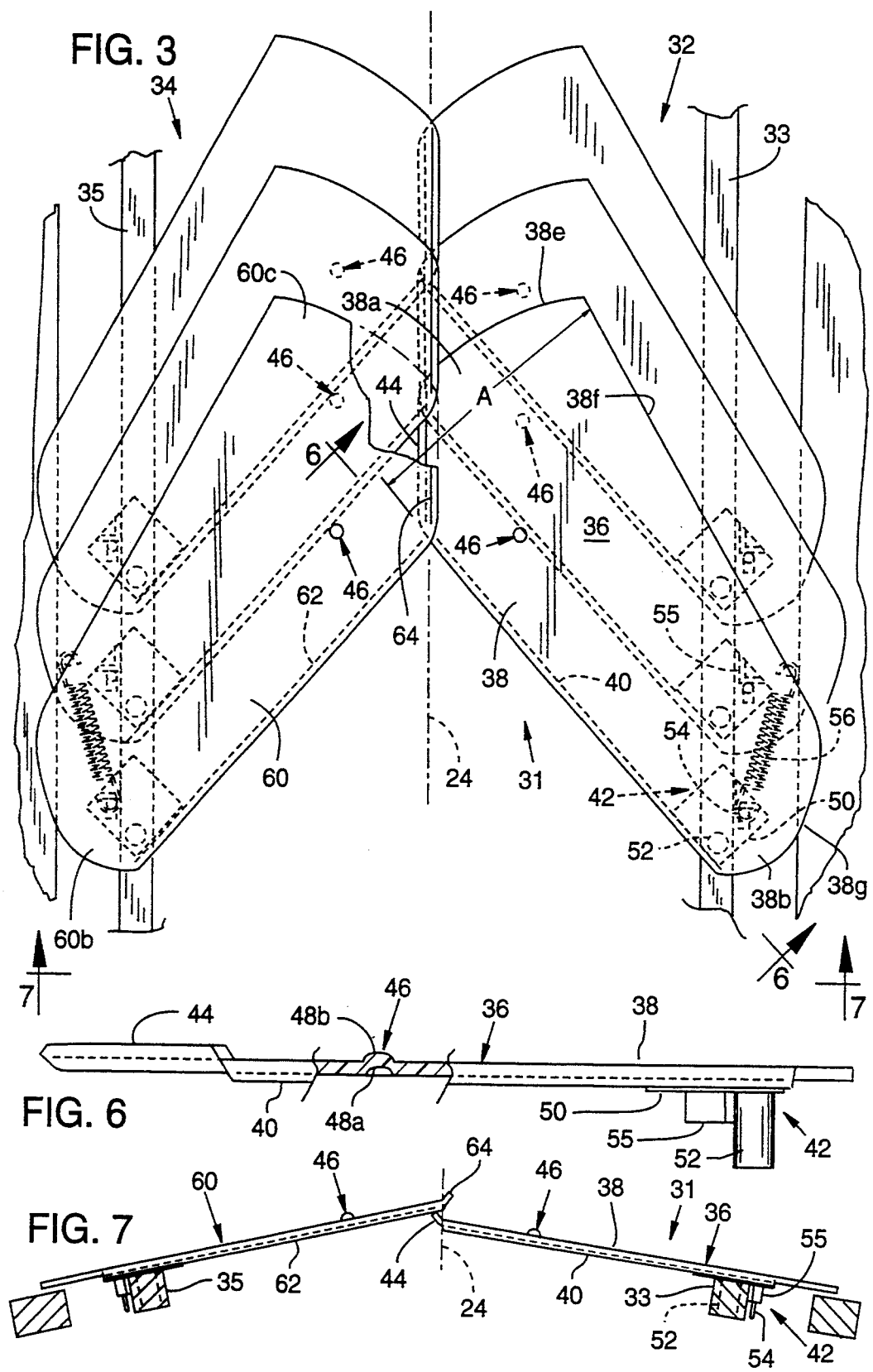

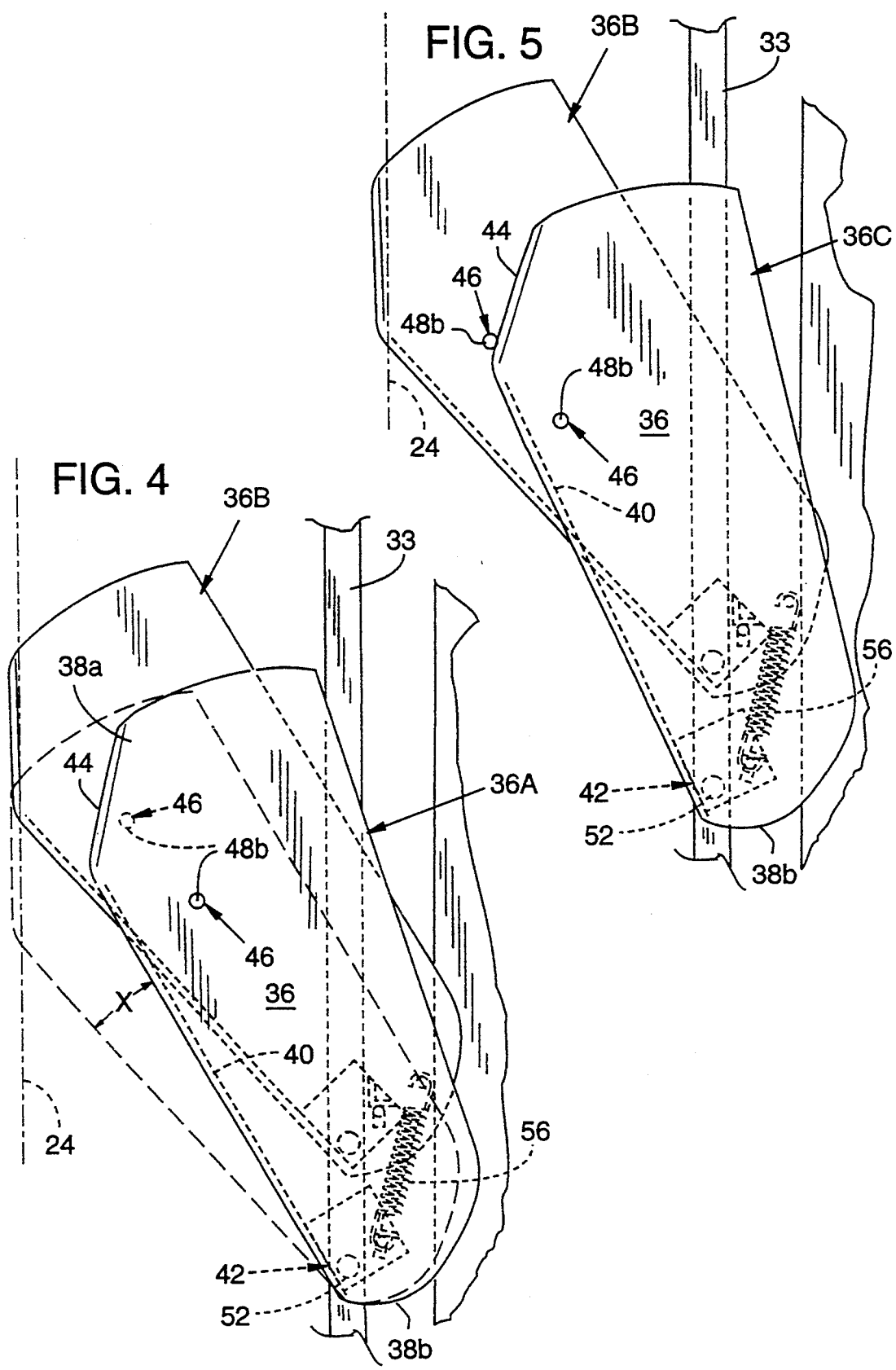

CATCHER PLATE ASSEMBLY FOR A HARVESTER

BACKGROUND OF THE INVENTION

This invention relates to a harvester, and more particularly to a mobile harvester of the type that is adapted to be driven along a row of plants with harvesting of product growing on the plants, such as fruit or berries, produced by shaking the plants. A harvester of this description is commonly used in the harvesting of fruit such as blueberries, raspberries, coffee beans, etc., although in indicating these fruits, it is not intended to limit the machine of the invention to any particular product.

In the usual harvester, a mobile frame is provided which is supported as by wheels for movement over the ground. The frame of the machine straddles the plants in the row from which the fruit is being harvested. Fruit is harvested by shaking the plants with various forms of shakers, and the fruit then drops onto catcher plates which are part of the harvester machine. The catcher plates travel with the harvester under the crop-producing portions of the plants, and optimally are closely adjacent the ground, whereby the plates are least apt to be encumbered by the plant stem structure. The plates are normally inclined, which is to say they slope downwardly progressing outwardly from the center of any bush being processed, so that fruit by gravity on coming into contact with the plates will move laterally outwardly in the row.

For many years it has been common to provide metal catcher plates in the catcher plate system of a harvester. Material of relatively thin gauge could be used in the manufacture of the plates, which contributes to lessening the weight of the catcher plate system, an important consideration when it is remembered that the harvester often is required to travel over soft terrain.

A problem arising from the use of metal catcher plates, however, is that while a metal plate has a degree of flexibility, a thin plate (particularly if made from aluminum) is relatively easily bent to an extent beyond which it becomes permanently deformed, and a plate or plates so bent seriously impairs the operability of a system. To strengthen a plate to resist such deformation adds weight to the system, and also introduces the possibility of damage to the plants being processed.

Plate damage occurring by reason of a plate striking and being bent beyond its elastic limit is a particular problem with low growing plants, where plant growth with fruit occurs close to the ground rather than at a raised elevation. An example of such a plant is the blueberry bush, which tends to spread out relatively close to the ground, as compared, for instance, to a raspberry bush, where cane or stem growth is substantially upright at close to ground level.

Catcher plates have been made from molded plastic, and conventionally these have had a rim of substantial mass extending about the perimeter of a plate. Normally this rim projects to either side of a central web expanse which forms the principal part of a plate. A plate of this description is relatively expensive to produce. Furthermore, the shallow recessed surface provided on the top and bottom of the plate provides catch regions for catching debris and other matter which on building up impairs plate movement.

The harvester of the instant invention features a catcher plate system which includes multiple plate members in the system cut from a sheet of plastic of uniform thickness. Sheet bodies are produced which are provided with turned-over lips bent into the sheet material of the sheet body. Such a turned-over lip, for instance, may provide the leading edge of the plate member when the vehicle moves through a field, and also a remote edge of the plate member which moves across the growth of the bush. These turned-over or bent lips add a limited degree of desired stiffness, and also have the function of providing an enlarged fender surface which contacts plant growth and rubs against it without causing damage to the growth. Because the sheet bodies, while being stiff, are flexible, they bend without deforming when striking plant growth. Structure is provided preventing face-to-face contact of adjacent plate members, to eliminate sliding friction, particularly under wet conditions, that restricts movement of the plates.

These and other objects and advantages are attained by the invention, which is described hereinbelow in conjunction with the accompanying drawings, wherein:

BRIEF DESCRIPTION OF THE DRAWINGS

FIG. 3 is a top view looking downwardly at the forward end of a catcher plate system in the vehicle;

FIG. 4 illustrates two plates in the system, with the lead plate angularly displaced;

FIG. 5 is similar to FIG. 4, but shows the lead plate angularly displaced a greater amount;

FIG. 6 is a view taken along the line 6—6 in FIG. 3; and

FIG. 7 is a view taken along the line 7—7 in FIG. 3.

DETAILED DESCRIPTION OF THE PREFERRED EMBODIMENT

Figure 1:
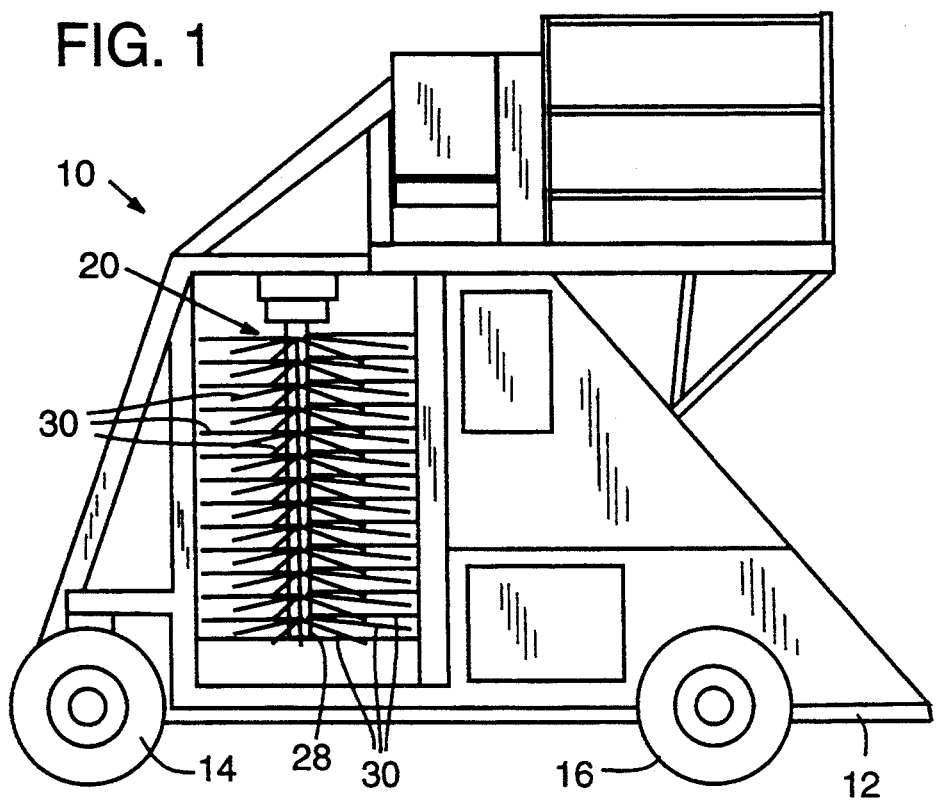
FIG. 1 is a simplified side view of a harvester vehicle.
Figure 2:
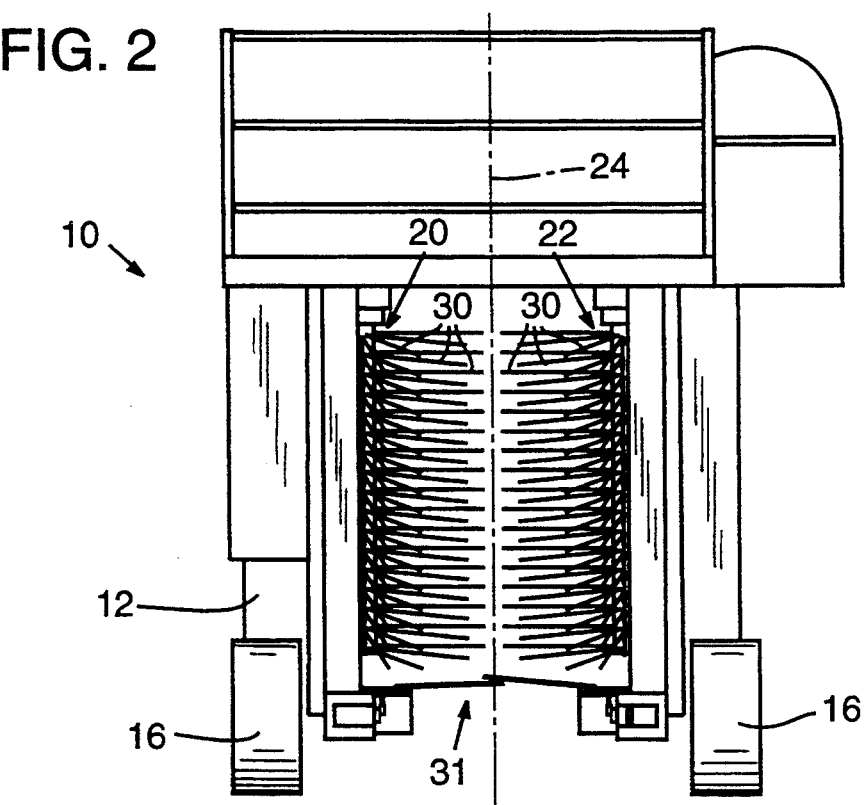
FIG. 2 is a rear end view of the vehicle shown in FIG. 1.

Referring now to the drawings, and more particularly to FIGS. 1 and 2, a harvester such as might incorporate the catcher plate system of the instant invention is indicated generally at 10. The harvester includes a mobile frame 12 supported for movement over the ground by ground-traveling devices, such as the front wheel shown at 14 and rear powered driving wheels 16.

The harvester when used to harvest a harvest product such as raspberries or blueberries travels along a row of bushes containing the berries to be harvested with rear wheels 16 straddling the row of bushes. In the particular harvester illustrated the forward wheel 14 is disposed to one side of the harvester frame. Adjacent the forward end of the vehicle are a pair of rotatable shakers 20, 22. When the harvester is used, the harvester is driven along the row of plants with the row substantially midway between the sides of the harvester frame and shakers 20, 22. Thus, the center of the row being harvested substantially coincides with the dot-dash line 24 shown in FIG. 2.

Each shaker includes an elongate upright shaft such as the one shown at 28. The shaft mounts elongate flexible fingers 30, which project outwardly from the shaft and which move inwardly to penetrate the berry bush with the vehicle moving along the row, with the shaker rotated to compensate for vehicle movement. In addition to rotating, a shaker may conventionally be subjected to movement such as oscillatory up-and-down movement, or back-and-forth rotary movement, as is known in the art, for the purpose of more rapidly dislodging fruit or berries from the bush.

Material or product dropping from the bushes being processed drops downwardly upon being dislodged and falls onto a catcher plate assembly 31 provided adjacent the base of the vehicle.

The vehicle, as so far described, resembles the vehicle illustrated in my earlier issued patent entitled "Harvester with Moving Guide", U.S. Pat. No. 5,181,373.

Considering in greater detail the particulars of the catcher plate assembly (see FIG. 3), the assembly includes a row of plate members 32 supported on a frame member 33 extending the length of the vehicle and on one side of center 24, and an opposed row of plate members 34 mounted on a frame member 35 extending the length of the vehicle on the opposite side of vehicle center 24. In FIG. 3 only a few plates in each row have been shown, but it should be understood that ordinarily the rows of plates extend substantially the length of the vehicle.

The plate members in a row may all have the same construction. Referring to FIGS. 3 through 7, and considering plate member 36 of row 32 therein illustrated, the plate member includes a sheet body 38 cut from a sheet of plastic of uniform thickness throughout. The plastic composition of the sheet from which the sheet body is cut imparts to the sheet body a stiff but flexible character. Any of a number of the common plastics may be utilized as the plastic material, with polycarbonate plastic sheet body providing a highly satisfactory product. Describing further details of a specific sheet body 38, the body has an overall length of approximately 24 inches, a width at its widest point (indicated at A) of approximately 11 inches, and a 5/32 inch thickness. A plate member constructed as herein described from a polycarbonate plastic may be bent so that its ends are approximately at right angles to each other, without breaking or being permanently deformed.

Since the plate member is cut directly from a plastic sheet, the sheet body need not be prepared with a molding process, as would be necessary were the plate member to be an injected molded product.

The sheet body is prepared preferably from a plastic with at least a limited thermoplasticity, in that under heat and pressure a permanent deformation may be imparted to the sheet which is retained on cooling.

Sheet body 38 is prepared to have an elongate turned-over lip 40 extending continuously along the length of a leading edge in the sheet body. The lip is prepared by heating and forcibly bending over the sheet body along its forward margin to produce, after cooling, a turned-over lip as a permanent deformation in the sheet body. The edge which has lip 40 formed therealong is referred to as a leading edge, as this is the edge which leads the sheet body with the plate member mounted on the harvester and which first comes in contact with any plant growth in a row.

Plate member 36 further includes a pivot means or pivot pin structure 42 which is secured to the underside of sheet body 38 and provides, a will hereinafter be described, for pivotal movement of the plate member as may be necessary to enable a plant to move past the plate member when the machine moves along the row. Pivot means 42 is mounted on sheet body 38 adjacent end or extremity 38b of the sheet body. The sheet body is generally elongate in shape with ends 38a, 38b being at opposite extremities and end 38b being the smaller of the these two ends.

Extending at a sharp angle with respect to the leading edge is a straight edge provided with turned-over lip 44. Lip 44 is also formed by permanently bending the material of sheet body 38. Unlike lip 40 which is turned over with the sheet body softened by heating to project downwardly from the underside of sheet body 38, lip 44 is turned over to project upwardly from the upper side of the sheet body.

In addition to the edges having lips 40 and 44, the sheet body is bounded by curved edge 38e, straight edge 38f and curved edge 38g.

An indent/detent 46 is formed in the sheet body of a plate member, with heating and permanently deforming the material of sheet body to produce the indent/detent. Deforming the material to produce the indent/detent results in a concave, dimple-like depression 48a on the underside of the sheet body, and a convex projection 48b on the opposite upper face of the sheet body.

A pivot means 42 has been earlier described. This pivot means, or pivot structure, includes a bracket plate 50 of approximately square outline. The bracket plate lies flush against the underside of the sheet body. The bracket plate lies generally directly to the rear of lip 40, and has a thickness ordinarily about approximating the height of the lip. This tends to minimize the overall thickness of the plate member (the overall thickness of the member as described being equal to the thickness of the sheet body plus the thickness of the bracket plate, as compared to this thickness plus the height of lip 40 were the lip and bracket plate on opposite sides of the sheet body).

Pivot means 40 further includes a pivot pin 52 joined to and projecting normal to plate 50. Also part of the structure is a spring anchor post 54 for mounting the end of a spring, and a stop abutment 55.

With the plate member mounted in place, small end 38b of the plate member resides over the top of frame member 33. Pin 52 extends into a suitable socket provided on the frame member. The plate member is pivotable about an upright axis coinciding with the longitudinal axis of pin 52.

In row of plate members 32, multiple plate members 36 are provided, with adjacent members overlapped. The normal at rest position of a plate member is with leading-edge having lip 40 facing forwardly and inclining rearwardly progressing from the pivot mounting for the plate member. The edge having lip 44 is located substantially at center 24 of the harvester, and substantially parallel to the longitudinal axis of the harvester. The overlapped condition that exists is with the rear portion of a forward plate member overlying the forward portion of the plate member immediately to the rear. The overlapping region of the plate members are kept spaced apart, by reason of projection 48b of the indent-detent in the rear one of the two plate members coming up against the underside or face of the forward one of the two plate members.

A spring 56 extends from each plate member to an opposite end anchored on the frame. The spring urges each plate member to its normal at rest position, determined by abutment 55 engaging part of the frame.

A plate member is pivotable rearwardly from the normal at rest position for the plate member just described, with tensing of its biasing spring 56. In FIG. 4, the overlying plate member shown at 36A has swung rearwardly over an angle indicated at "X", while the underlying plate member shown at 36B has undergone no movement and occupies its normal at rest position.

With two plate members in this relative position, lip 40 along the leading edge of plate member 36A has started to move over the top face of underlying plate member 36B. Thus, a spacing between the two plate members is produced, not only by projection 48b in underlying plate member 36B, but also by the lip in plate member 36A.

With further rearward swinging movement of the overlying plate member, as demonstrated by the plate member shown at 36C in FIG. 5, the overlying plate member moves free of projection 48b in the underlying plate member, and spacing between the two plate members is entirely of the lip 40 in the overlying plate member.

Row of plate members 34 is made up of multiple plate members 60 extending as a row and pivotally mounted on frame member 35. Each plate member 60 has a construction which is symmetrically the same but opposite to the construction of a plate member 36. Thus, the plate member has a small end 60b and a large end 60c, and with the small end generally to the left of the large end with the row illustrated as in FIG. 3, rather than to the right of the large end as in the case of plate member 36. As in the case of plate member 36, member 60 has a leading edge which is straight and provided with a turned-over lip 62 bent downwardly and extending along its length. Lip 64 bent into the sheet body is turned in an upward direction. Spacing the trailing portion of a plate member over the lead portion of a plate member directly below and behind it is a suitable projection formed by an indent-detent present in each plate member.

With the construction described, the plate members in a row are maintained out of face-to-face contact, which is important in reducing frictional contact between two adjacent plate members inhibiting their relative movement. This frictional drag is particularly evident under wet conditions, with any wet films on the overlapping opposed faces of adjacent plate members tending to produce considerable drag inhibiting relative plate movement. As earlier discussed, this spacing of the plate members is produced with the plate members in their normal at rest position by the indent-detents described. With relative movement of the plate members, spacing is produced by the lip on leading edge of a plate member moving into engagement with the upper face of an underlying plate member.

The turned-over lips described have an additional function of providing fender surfaces minimizing damage to stalk or branch growth in the bushes containing the crop being harvested. At the location of the turned-over lips, a smoothly contoured surface is provided which does not cut but instead glides smoothly over this growth.

The turned-over lips provided along remote ends edges of the plate members act as deflector surfaces tending to deflect material falling on the plates outwardly to the sides of the machine.

While an embodiment of the invention has been described, obviously changes and variations are possible without departing from the invention.

It is claimed and desired to secure by letters patent:

1. A harvester having a traveling frame and further comprising;
    a catcher plate assembly for collecting harvested product dropped thereon, the plate assembly comprising multiple plate members mounted on said frame and disposed in a row with adjacent plate members in overlapped relation,
    each plate member including a sheet body cut from a sheet of stiff but flexible plastic having uniform thickness throughout,
    each sheet body having a leading edge and further including a turned-over leading-edge lip bent into the sheet body and extending along the length of the leading edge,
    each sheet body further including an indent-detent pressed into the sheet body in a region inwardly from its perimeter to form a projection projecting from one face of the sheet body, and the projection establishing a spacing between the sheet body of one plate member and the sheet body of an adjacent plate member overlapped therewith.

2. The harvester of claim 1, wherein each sheet body has an elongate shape with opposite extremities, and each plate member further includes pivot means pivotally mounting one extremity of the sheet body in the plate member for pivotal movement of the plate member about an upright axis, the sheet body in the plate member having a terminal edge extending along the other extremity in the sheet body and the plate member further including another lip bent into the sheet body extending along this terminal edge.

3. The harvester of claim 2, wherein the sheet body of a plate member has an upper face and a lower face, the leading-edge lip is bent downwardly to project below the lower face of the sheet body of a plate member, and said pivot means includes a pivot pin about which pivotal movement occurs and a bracket plate supporting the pivot pin, the bracket plate being disposed against the lower face of the sheet body of a plate member in a region to one side of said leading-edge lip.

4. A harvester vehicle having a traveling frame and opposed, generally horizontal, spaced-apart frame members in said traveling frame,
    a first series of multiple plate members disposed in a row and in overlapped relation supported on one of said frame members, and a second series of multiple plate members disposed in a row and in overlapped relation supported on the other of said frame members, with the two rows of plate members being opposite each other,
    each plate member including a sheet body cut from a sheet of stiff but flexible plastic material of uniform thickness,
    the sheet body of a plate member having an elongate shape and opposite extremities and the sheet body of a plate member having an upper face and a downwardly facing lower face,
    a plate member further including pivot pin structure mounting the plate member for pivotal movement about an upright axis, said pivot pin structure including a pivot pin and a bracket plate supporting the pin, the bracket plate being secured against the lower face of the sheet body of a plate member,
    the sheet body of a plate member having a turned-over leading-edge lip bent into the sheet body protruding downwardly from the lower face of the sheet body and extending along the leading edge of the sheet body and said bracket plate being located rearwardly in a sheet body from the leading-edge lip of the body.

5. The harvester of claim 4, wherein the sheet body of a plate member further includes another turned-over lip bent into the sheet body which forms the plate member, the sheet body having a remote edge remote from the pivot pin structure and the said other turned-over lip extending along said edge and projecting upwardly from the upper face of the sheet body.

6. The harvester of claim 5, which further comprises an indent-detent pressed into the sheet body of a plate member, to provide a protrusion from one face of the sheet body, and said protrusion produces a spacing between the sheet body of one plate member and the sheet body of an overlapped adjacent plate member.

7. The harvester vehicle of claim 6, wherein the indent-detent is pressed into the sheet body of a plate member to project upwardly from the upper face of the sheet body.

* * * * *